United States Patent
Komatsu

(10) Patent No.: US 6,804,531 B2
(45) Date of Patent: Oct. 12, 2004

(54) CLOSED LOOP POWER CONTROL WITH ADJUSTABLE WIDTH BASED ON CHANNEL QUALITY

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 637 days.

(21) Appl. No.: 09/799,788

(22) Filed: Mar. 7, 2001

(65) Prior Publication Data

US 2001/0023188 A1 Sep. 20, 2001

(30) Foreign Application Priority Data

Mar. 15, 2000 (JP) ........................................ 2000-072049

(51) Int. Cl.$^7$ ................................................ H04Q 7/20
(52) U.S. Cl. ...................................... 455/522; 370/318
(58) Field of Search .................. 455/522, 69, 504, 455/505, 506, 13.4, 127.1, 453; 370/318

(56) References Cited

U.S. PATENT DOCUMENTS

| | | | |
|---|---|---|---|
| 5,461,639 A | 10/1995 | Wheatley, III et al. | |
| 6,549,785 B1 | * 4/2003 | Agin | ........................ 455/522 |
| 6,603,980 B1 | * 8/2003 | Kitagawa et al. | ........... 455/522 |
| 6,654,613 B1 | * 11/2003 | Maeng et al. | ................ 455/522 |

FOREIGN PATENT DOCUMENTS

| | | |
|---|---|---|
| JP | 7-283783 | 10/1995 |
| JP | 08-032514 | 2/1996 |
| JP | 9-275373 | 10/1997 |
| JP | 10-079701 | 3/1998 |
| JP | 11-177488 | 2/1999 |
| JP | 2000-307512 | 11/2000 |
| JP | 2000-349704 | 12/2000 |
| WO | WO 98/49785 | 11/1998 |
| WO | WO 99/53630 | 10/1999 |

OTHER PUBLICATIONS

European Search Report dated Jan. 29, 2003.
405118 Japanese Office with English translation of pertinent portions dated Dec. 3, 2002.

* cited by examiner

*Primary Examiner*—Nick Corsaro
(74) *Attorney, Agent, or Firm*—Whitham, Curtis & Christofferson, PC

(57) ABSTRACT

A transmission power control system of a mobile communications base stations controls the transmission power level of a mobile station. A mobile station receives a transmission power control command transmitted over a forward-link from a base station for making a reception condition of a reverse-link at the base station substantially fixed. A reception quality estimation section of the mobile station estimates the reception quality of the transmission power control command, and a transmission power control section controls the transmission power with a control width which is varied in response to the reception quality estimated by the reception quality estimation section. If the communication conditions of the forward-link becomes unfavorable, the transmission power of the mobile station is prevented from being displaced by a significant amount in a direction different from the last instruction from the base station.

20 Claims, 3 Drawing Sheets

CLOSED LOOP POWER CONTROL WITH ADJUSTABLE WIDTH BASED ON CHANNEL QUALITY

BACKGROUND OF THE INVENTION

1. Field of the Invention

The present invention relates to a mobile station and a base station as well as a mobile communication system which uses them, and more particularly to a transmission power control system for controlling the transmission power of a mobile communication system such as a car phone or a portable telephone system.

2. Description of the Related Art

In a cellular system which employs a direct spread code division multiple access (DS-CDMA) system, a plurality of mobile stations use radio waves of the same frequency at the same time to communicate with one or more base stations. In the system of the type mentioned, in order to prevent deterioration of the reception quality by interference, it is essential to equalize the reception levels from different mobile stations at a base station.

Therefore, in mobile communication of the DS-CDMA system, it is required to control the transmission level of each mobile station at a high speed and with a high degree of accuracy over a wide dynamic range in response to a variations of the distance from the mobile station to the base station or to an instantaneous variation by shadowing of the mobile station by a building or a like structure or by multi-paths of the mobile station.

Since the variation of the distance from a mobile station to a base station or shadowing appears also with the reverse-link similarly, it can be overcome to some degree by open loop power control by which the transmission level for the reverse-link of the mobile station is controlled in response to the reception level in the forward-link by the mobile station. However, in order to overcome an instantaneous variation by multi-paths, where different frequency bands are used for the reverse-link and the forward-link, closed loop power control is required by which a control command is sent from the base station to the mobile station in response to the reception level in the reverse-link by the base station and control the transmission level for the reverse-link by the mobile station.

More particularly, according to the closed loop power control, the base station measures the reception level within a time slot of 0.625 ms (milliseconds), and compares the reception level with a reference value to determine whether or not the reception level is equal to or higher than the reference level. Then, when the base station determines that the reception level is equal to or higher than the reference value, it issues an instruction over the forward-link to vary the transmission level of the mobile station by −1 dB (decibel). On the contrary, when the base station determines that the reception level is lower than the reference value, it issues an instruction over the forward-link to vary the transmission level of the mobile station by +1 dB. The mobile station thus varies the transmission level in accordance with the instruction for the transmission level variation received from the base station beginning with the time slot after the reception of the instruction.

Such a mobile communication system of the closed loop power control system is disclosed, for example, in Japanese Patent Laid-Open No. 79701/1998, Japanese Patent Laid-Open No. 177488/1999 or Japanese Patent No. 2,974,274.

A disadvantage of the mobile communication system of the closed loop power control system described above is that, when the communication quality by the forward-link is poor, the mobile station is likely to misinterpret the instruction for the transmission level variation received from the base station. In particular, even if the base station issues an instruction (for example, of a transmission series of "00") to vary the transmission level of the mobile station by −1 dB (decibel), if the line condition is unfavorable, then the mobile station may recognize that it receives an instruction (for example, a reception series of "11") to vary the transmission level of the mobile station by +1 dB (decibel) and thus vary the transmission level of the mobile station by +1 dB. In this instance, interference in the reverse-link with some mobile stations at the base station may increase and disturb the communication of the base stations with the other mobile station.

On the contrary, if the base station issues an instruction (for example, of a transmission series of "11") to vary the transmission level of the mobile station by +1 dB (decibel), if the line condition is unfavorable, then the mobile station may recognize that it receives an instruction (for example, a reception series of "00") to vary the transmission level of the mobile station by −1 dB (decibel) and thus vary the transmission level of the mobile station by −1 dB. In this instance, the communication quality in the reverse-link to the base station may be further deteriorated and possibly cause interruption of the communication.

SUMMARY OF THE INVENTION

It is an object of the present invention to provide a transmission power control system which can control the transmission level of a mobile station so that the reception condition in the reverse-link may be fixed without the necessity to increase the number of bits of a command for instruction to raise or lower the transmission level or without raising the transmission power of a command.

In order to attain the object described above according to an aspect of the present invention, there is provided a mobile station, comprising means for receiving a transmission power control command transmitted over a forward-link from a base station for making a reception condition of a reverse-link at the base station substantially fixed, a reception quality estimation section for estimating the reception quality of the transmission power control command, and a transmission power control section for controlling the transmission power with a control width varied in response to the reception quality estimated by the reception quality estimation section. With the mobile station, even if the communication condition of the forward-link becomes unfavorable, the transmission power of the mobile station is prevented from being displaced by a great amount in a direction different from the instruction from the base station, and the reception condition from the reverse-link at the base station can be fixed.

According to another aspect of the present invention, there is provided a base station, comprising means for receiving a transmission power control command transmitted over a reverse-link from a mobile station for making a reception condition of a forward-link at the mobile station substantially fixed, a reception quality estimation section for estimating the reception quality of the transmission power control command, and a transmission power control section for controlling the transmission power with a control width varied in response to the reception quality estimated by the reception quality estimation section. With the base station, the transmission level thereof can be controlled so that the reception condition through the forward-link by a mobile station may be fixed.

In both of the mobile station and the base station, the reception quality estimation section may estimate the reception quality of the transmission power control command from a reception level of the transmission power control command. This allows the reception quality of the transmission power control command to be estimated and allows the control width of the transmission power to be determined.

As an alternative, the reception quality estimation section may estimate the reception quality of the transmission power control command from a signal interference rate of the transmission power control command. Also this allows the reception quality of the transmission power control command to be estimated and allows the control width of the transmission power to be determined.

As another alternative, the reception quality estimation section may estimate the reception quality of the transmission power control command from a bit error rate of a slot which includes the transmission power control command. Also this allows the reception quality of the transmission power control command to be estimated and allows the control width of the transmission power to be determined.

As a further alternative, the reception quality estimation section may estimate the reception quality of the transmission power control command from a level of a channel estimation value which is used for demodulation of the transmission power control command. Also this allows the reception quality of the transmission power control command to be estimated and allows the control width of the transmission power to be determined.

According to a further aspect of the present invention, there is provided a mobile communication system, comprising a mobile station, and a base station including a transmission power control command production section for transmitting a transmission power control command for the mobile station in response to the reception quality of a reception signal received over a reverse-link from the mobile station, the mobile station including a reception quality estimation section for estimating the reception quality of the transmission power control command from the base station and a transmission power control section for controlling the transmission power with a control width varied in response to the quality estimated by the reception quality estimation section.

As a still further aspect of the present invention, there is provided a mobile communication system, comprising a base station, and a mobile station including a transmission power control command production section for transmitting a transmission power control command for the base station in response to the reception quality of a reception signal received over a forward-link from the base station, the base station including a reception quality estimation section for estimating the reception quality of the transmission power control command from the mobile station and a transmission power control section for controlling the transmission power with a control width varied in response to the quality estimated by the reception quality estimation section.

With both of the mobile communication system, even if the communication condition of the forward-link or the reverse-link becomes unfavorable, the transmission power of the mobile station or the base station is prevented from being displaced by a great amount in a direction different from the instruction from the base station or the mobile station, and the reception condition from the reverse-link or the forward-link at the base station or the mobile station can be fixed.

In both of the mobile communication system, the reception quality estimation section may estimate the reception quality of the transmission power control command from a reception level of the transmission power control command. This allows the reception quality of the transmission power control command to be estimated and allows the control width of the transmission power to be determined.

As an alternative, the reception quality estimation section may estimate the reception quality of the transmission power control command from a signal interference rate of the transmission power control command. Also this allows the reception quality of the transmission power control command to be estimated and allows the control width of the transmission power to be determined.

As another alternative, the reception quality estimation section may estimate the reception quality of the transmission power control command from a bit error rate of a slot which includes the transmission power control command. Also this allows the reception quality of the transmission power control command to be estimated and allows the control width of the transmission power to be determined.

As a further alternative, the reception quality estimation section may estimate the reception quality of the transmission power control command from a level of a channel estimation value which is used for demodulation of the transmission power control command. Also this allows the reception quality of the transmission power control command to be estimated and allows the control width of the transmission power to be determined.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
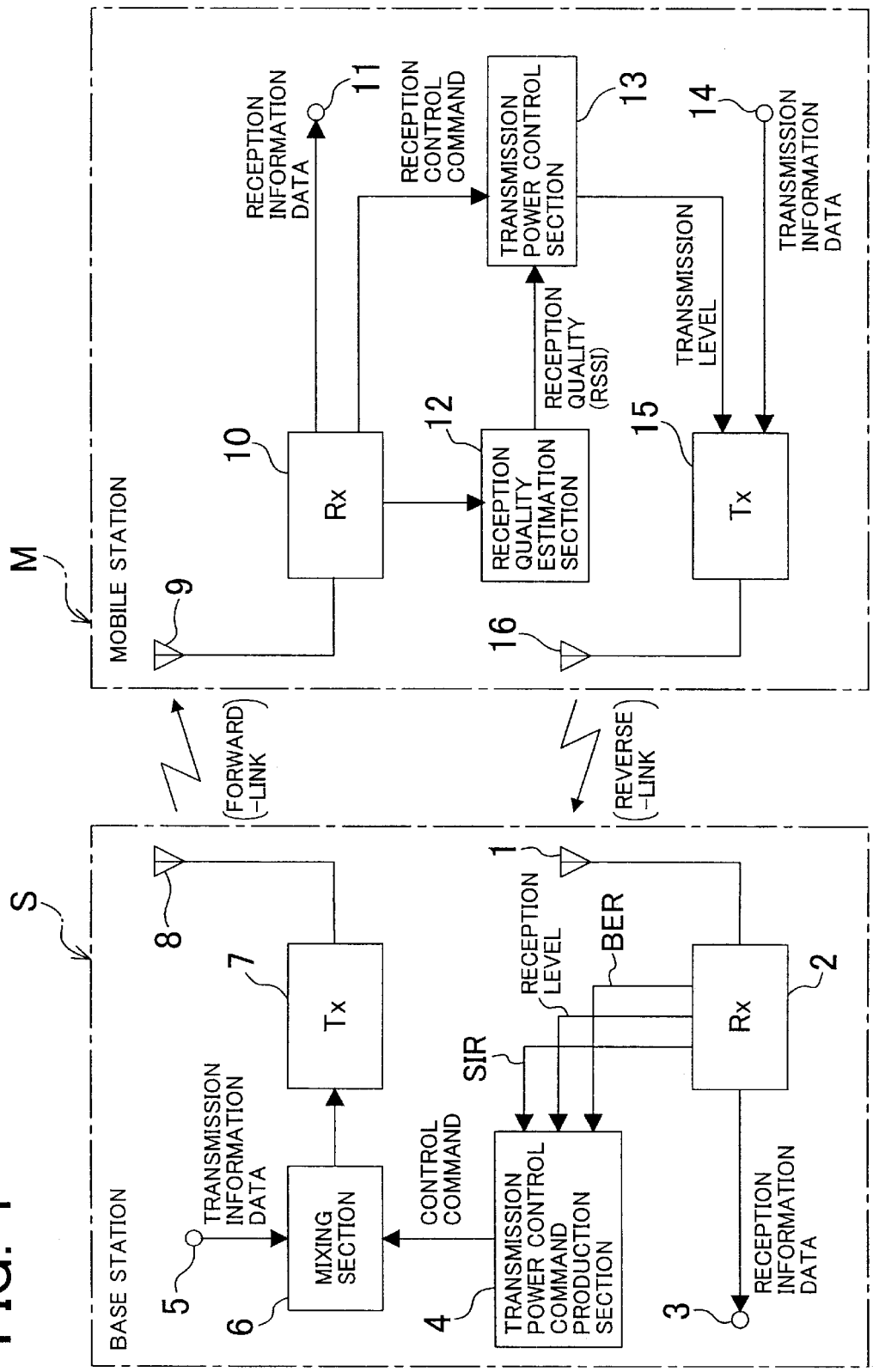
FIG. 1 is a block diagram showing a mobile communication system to which the present invention is applied.

Referring first to FIG. 1, there is shown a mobile communication system to which the present invention is applied. The mobile communication system includes a base station S and a mobile station M. The base station S includes an antenna 1 for receiving a signal of the reverse-link transmitted from the mobile station M, and a reception section (Rx) 2 for despreading and demodulating the signal received by the antenna 1 to produce reception information data. The reception information data is outputted to terminal 3.

The reception section 2 detects the reception signal intensity (RSSI) as a reception level and estimates an instantaneous signal interference rate (SIR) and a bit error rate (BER). The reception section 2 supplies the detected RSSI and the estimated instantaneous SIR and BER, which are information representative of the reception quality, to a transmission power control command production section 4.

The transmission power control command production section 4 produces a control command for increasing or decreasing the transmission power of the mobile station in response to the RSSI, instantaneous SIR or BER supplied thereto. As an example, when the SIR is equal to or lower than a threshold value, a control command for increasing the transmission power is produced, but when the SIR exceeds the threshold value, another control command for decreasing the transmission power is produced.

The control command thus produced is supplied to a transmission section (Tx) 7 through a mixing section 6 together with information data supplied from a terminal 5. The transmission section 7 performs modulation based on the information data and the control command and further performs spreading to produce a signal for the forward-link. The signal for the forward-link is transmitted from an antenna 8. It is to be noted that the control command is composed of 1 bit and indicates increase with the value 1 but indicates decrease with the value 0, and the transmission rate is, for example, 1,600 bps fixed.

In the mobile station M, the signal of the forward-link is received by an antenna 9 and despread and demodulated by a reception section 10. The reception information data obtained at the reception section 10 is outputted to terminal 11, and the reception control command obtained similarly is supplied from the reception section 10 to a transmission power control section 13. Further, the RSSI of the reception control command is detected by the reception section 10 and supplied to a reception quality estimation section 12. The reception quality estimation section 12 estimates or measures the reception quality of the control command from the value of the RSSI and supplies the estimated reception quality to the transmission power control section 13.

The transmission power control section 13 instructs a transmission section 15 to make an adjustment direction, that is, an increasing or decreasing direction of the transmission power in accordance with the reception control command supplied periodically thereto from the reception section 10 and instructs the transmission section 15 to make an adjustment width (step amount) based on the reception quality supplied thereto from the reception quality estimation section 12. When the reception control command has the value 1, the transmission power control section 13 instructs the transmission section 15 to increase the transmission power, but when the reception control command has the value 0, the transmission power control section 13 instructs the transmission section 15 to decrease the transmission power. Further, for example, as seen from a flow chart of FIG. 2, when the reception quality is equal to or lower than a certain level, that is, a set threshold value, the transmission power control section 13 instructs the transmission section 15 to make an adjustment width of 0.5 dB, but when the reception quality exceeds the level, the transmission power control section 13 instructs the transmission section 15 to make another adjustment width of 1.0 dB.

The transmission section 15 performs modulation based on the transmission information data supplied thereto from a terminal 14 and further performs spreading to obtain a signal for the reverse-link. The signal for the reverse-link is transmitted from an antenna 16. The transmission power at this time is varied stepwise in accordance with the instruction from the transmission power control section 13. Since the mobile station M estimates the reception quality from the RSSI and varies the adjustment width for the transmission power in response to the reception quality in this manner, even if the reception quality of the mobile station M decreases, the transmission power of the mobile station M is varied with an adjustment width to compensate for the decrease of the reception quality.

It is to be noted that, for the estimation of the reception quality, the SIR of the reception control command may be used in place of the RSSI of the reception control command. Further, the reception quality may otherwise be determined based on the RSSI or the SIR of the channel estimation value or the RSSI, SIR or BER of the data part other than the reception control command.

Figure 2:
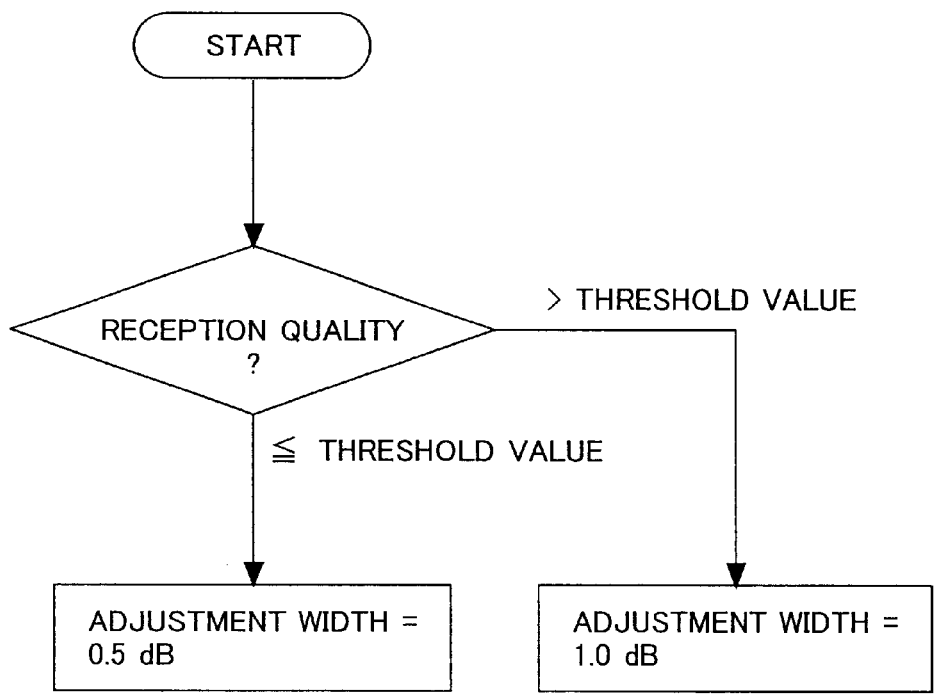
FIG. 2 is a flow chart illustrating an adjustment width determination process executed by the mobile communication system of FIG. 1.

Further, while the flow chart of FIG. 2 indicates that the adjustment width is limited to two different values, it may have more than two values using a plurality of threshold values. The adjustment width may be set to the value 0 so that the transmission power may not vary at all.

Figure 3:
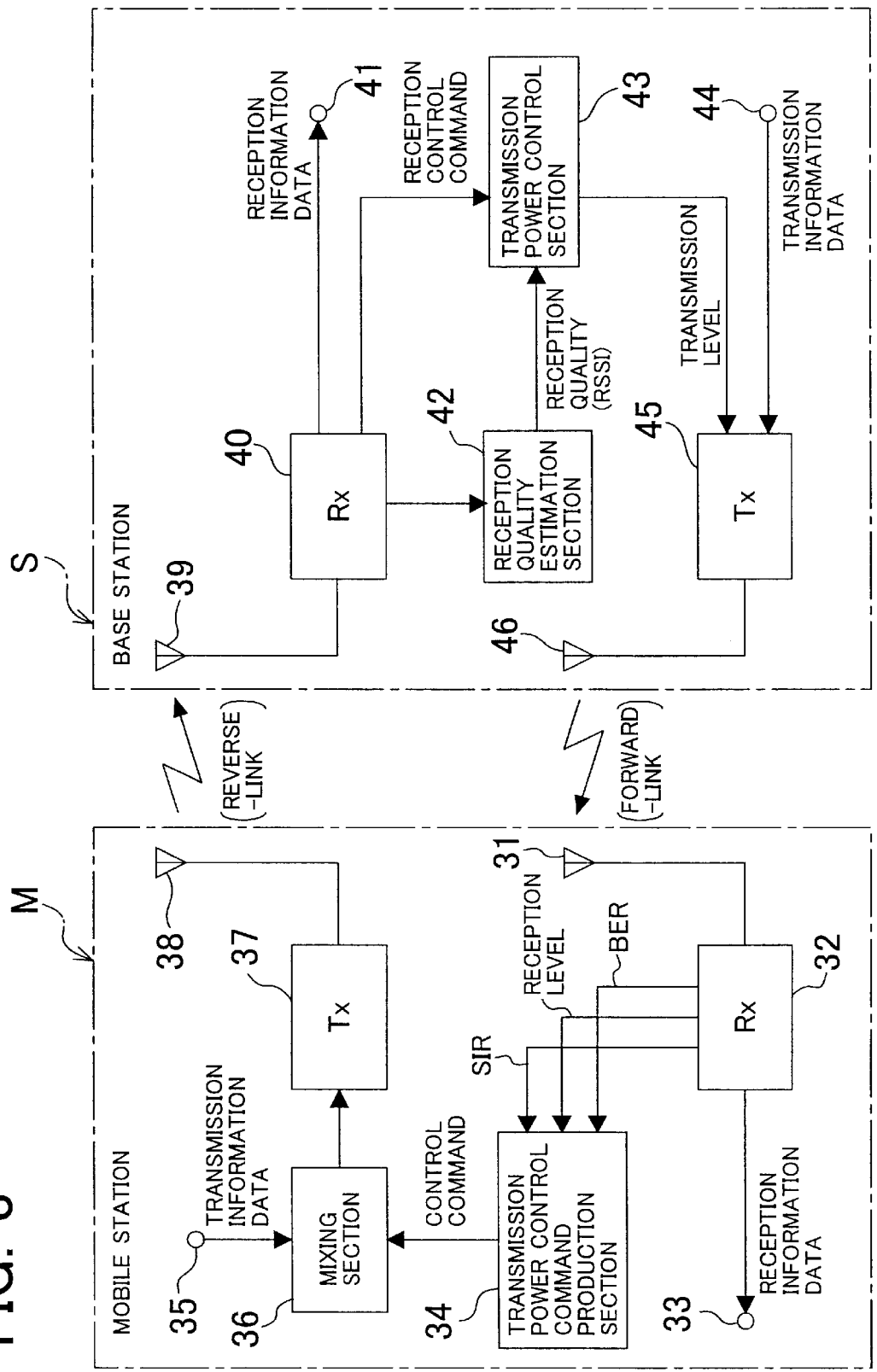
FIG. 3 is a block diagram showing another mobile communication system to which the present invention is applied.

The mobile communication system shown in FIG. 1 may be modified such that each of the base station S and the mobile station M has the construction of the other party described above. The modified mobile communication system is shown in FIG. 3. Referring to FIG. 3, the mobile station M includes an antenna 31 for receiving a signal the forward-link transmitted from the base station S, and a reception section (Rx) 32 for despreading and demodulating the signal received by the antenna 31 to produce reception information data. The reception information data is outputted to terminal 33. Further, the reception section 32 detects the reception signal intensity (RSSI) as a reception level and estimates an instantaneous signal interference rate (SIR) and a bit error rate (BER). The detected RSSI and the estimated instantaneous SIR and BER, which are information representative of the reception quality, are supplied to a transmission power control command production section 34.

The transmission power control command production section 34 produces a control command for increasing or decreasing the transmission power of the mobile station M in response to the RSSI, instantaneous SIR and BER supplied thereto. The control command is supplied to a transmission section (Tx) 37 through a mixing section 36 together with information data supplied thereto from a terminal 35. The transmission section 37 performs modulation based on the information data and the control command and further performs spreading to obtain a signal for the reverse-link. The signal for the reverse-link is transmitted from an antenna 38.

In the base station S, the signal of the reverse-link is received by an antenna 39 and despread and demodulated by a reception section 40. The information data obtained at the reception section 40 is outputted to terminal 41 while the reception control command obtained similarly is supplied to a transmission power control section 43. Further, the RSSI of the reception control command is detected by the reception section 40 and supplied to a reception quality estimation section 42.

The reception quality estimation section 42 estimates the reception quality of the control command from the value of the RSSI and supplies the estimated reception quality to the transmission power control section 43. The transmission power control section 43 instructs a transmission section 45 to make an adjustment of the transmission power based on the reception control command supplied periodically thereto from the reception section 40 and instructs the transmission section 45 to make an adjustment width (step amount) based on the reception quality supplied thereto from the reception quality estimation section 42.

The transmission section 45 performs modulation based on the transmission information data supplied thereto from a terminal 44 and further performs spreading to obtain a signal for the forward-link. The signal for the forward-link is transmitted from an antenna 46. The transmission power at this time is varied stepwise in accordance with the instruction from the transmission power control section 43. Since the base station S estimates the reception quality from the RSSI and varies the adjustment width of the transmission power in response to the reception quality in this manner, even if the reception quality at the base station S decreases, the transmission power of the base station is varied with an adjustment width to compensate for the decrease of the reception quality.

It is to be noted that the present invention can be applied also to communication simultaneously with two or more base stations. Further, the present invention can be applied similarly to a case wherein the transmission power ratio when a base station transmits signals simultaneously from two or more antennae thereof is determined with a control command from a mobile station by varying the ratio of the transmission power in response to the reception quality.

While preferred embodiments of the present invention have been described using specific terms, such description is for illustrative purposes only, and it is to be understood that changes and variations may be made without departing from the spirit or scope of the following claims.

What is claimed is:

1. A mobile station, comprising:
   means for receiving a transmission power control command transmitted over a forward-link from a base station for making a reception condition of a reverse-link at said base station substantially fixed;
   a reception quality estimation section for estimating the reception quality of said transmission power control command; and
   a transmission power control section for controlling the transmission power with a control width varied in response to the reception quality estimated by said reception quality estimation section;
   wherein said transmission power control section increases transmission power by said control width in response to the estimated reception quality when the transmission power control command indicates a need to increase said transmission power;
   said transmission power control section decreases transmission power with the control width in response to the estimated reception quality when the transmission power control command indicates a need to decrease said transmission power; and
   said increase or decrease of transmission power is performed in a unit of a time slot by said transmission power control section.

2. A mobile station as claimed in claim 1, wherein said reception quality estimation section estimates the reception quality of the transmission power control command from a reception level of the transmission power control command.

3. mobile station as claimed in claim 1, wherein said reception quality estimation section estimates the reception quality of the transmission power control command from a signal interference rate of the transmission power control command.

4. A mobile station as claimed in claim 1, wherein said reception quality estimation section estimates the reception quality of the transmission power control command from a bit error rate of a slot which includes the transmission power control command.

5. A mobile station as claimed in claim 1, wherein said reception quality estimation section estimates the reception quality of the transmission power control command from a level of a channel estimation value which is used for demodulation of the transmission power control command.

6. A base station, comprising:
   means for receiving a transmission power control command transmitted over a reverse-link from a mobile station for making a reception condition of a forward-link at said mobile station substantially fixed;
   a reception quality estimation section for estimating the reception quality of the transmission power control command; and
   a transmission power control section for controlling the transmission power with a control width varied in response to the reception quality estimated by said reception quality estimation section;
   wherein said transmission power control section increases transmission power by said control width in response to the estimated reception quality when the transmission power control command indicates a need to increase said transmission power;
   said transmission power control section decreases transmission power with the control width in response to the estimated reception quality when the transmission power control command indicates a need to decrease said transmission power; and
   said increase or decrease of transmission power is performed in a unit of a time slot by said transmission power control section.

7. A base station as claimed in claim 6, wherein said reception quality estimation section estimates the reception quality of the transmission power control command from a reception level of the transmission power control command.

8. A base station as claimed in claim 6, wherein said reception quality estimation section estimates the reception quality of the transmission power control command from a signal interference rate of the transmission power control command.

9. A base station as claimed in claim 6, wherein said reception quality estimation section estimates the reception quality of the transmission power control command from a bit error rate of a slot which includes the transmission power control command.

10. A base station as claimed in claim 6, wherein said reception quality estimation section estimates the reception quality of the transmission power control command from a level of a channel estimation value which is used for demodulation of the transmission power control command.

11. A mobile communication system, comprising:
    a mobile station; and
    a base station including a transmission power control command production section for transmitting a transmission power control command for said mobile station in response to the reception quality of a reception signal received over a reverse-link from said mobile station;
    said mobile station including a reception quality estimation section for estimating the reception quality of the transmission power control command from said base station and a transmission power control section for controlling the transmission power with a control width varied in response to the quality estimated by said reception quality estimation section
    wherein said transmission power control section increases transmission power by said control width in response to the estimated reception quality when the transmission power control command indicates a need to increase said transmission power;

said transmission power control section decreases transmission power with the control width in response to the estimated reception quality when the transmission power control command indicates a need to decrease said transmission power; and said increase or decrease of transmission power is performed in a unit of a time slot by said transmission power control section.

12. A mobile communication system as claimed in claim 11, wherein said reception quality estimation section estimates the reception quality of the transmission power control command from a reception level of the transmission power control command.

13. A mobile communication system as claimed in claim 11, wherein said reception quality estimation section estimates the reception quality of the transmission power control command from a signal interference rate of the transmission power control command.

14. A mobile communication system as claimed in claim 11, wherein said reception quality estimation section estimates the reception quality of the transmission power control command from a bit error rate of a slot which includes the transmission power control command.

15. A mobile communication system as claimed in claim 11, wherein said reception quality estimation section estimates the reception quality of the transmission power control command from a level of a channel estimation value which is used for demodulation of the transmission power control command.

16. A mobile communication system, comprising:

a base station; and a mobile station including a transmission power control command production section for transmitting a transmission power control command for said base station in response to the reception quality of a reception signal received over a forward-link from said base station;

said base station including a reception quality estimation section for estimating the reception quality of the transmission power control command from said mobile station and a transmission power control section for controlling the transmission power with a control width varied in response to the quality estimated by said reception quality estimation section wherein said transmission power control section increases transmission power by said control width in response to the estimated reception quality when the transmission power control command indicates a need to increase said transmission power;

said transmission power control section decreases transmission power with the control width in response to the estimated reception quality when the transmission power control command indicates a need to decrease said transmission power; and said increase or decrease of transmission power is performed in a unit of a time slot by said transmission power control section.

17. A mobile communication system as claimed in claim 16, wherein said reception quality estimation section estimates the reception quality of the transmission power control command from a reception level of the transmission power control command.

18. A mobile communication system as claimed in claim 16, wherein said reception quality estimation section estimates the reception quality of the transmission power control command from a signal interference rate of the transmission power control command.

19. A mobile communication system as claimed in claim 16, wherein said reception quality estimation section estimates the reception quality of the transmission power control command from a bit error rate of a slot which includes the transmission power control command.

20. A mobile communication system as claimed in claim 16, wherein said reception quality estimation section estimates the reception quality of the transmission power control command from a level of a channel estimation value which is used for demodulation of the transmission power control command.

* * * * *